(12) United States Patent
Ida

(10) Patent No.: US 10,515,442 B2
(45) Date of Patent: Dec. 24, 2019

(54) IMAGE PROCESSING APPARATUS THAT CORRECTS FOR LATERAL CHROMATIC ABERRATION, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Yoshiaki Ida, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/659,050

(22) Filed: Jul. 25, 2017

(65) Prior Publication Data

US 2018/0033122 A1  Feb. 1, 2018

(30) Foreign Application Priority Data

Jul. 28, 2016 (JP) ................................. 2016-148594

(51) Int. Cl.
*G06T 5/00* (2006.01)
*H04N 5/357* (2011.01)
*H04N 1/60* (2006.01)

(52) U.S. Cl.
CPC ........... *G06T 5/006* (2013.01); *H04N 1/6027* (2013.01); *H04N 5/3572* (2013.01)

(58) Field of Classification Search
CPC .... G06T 5/006; H04N 1/6027; H04N 5/3572; H04N 9/045
See application file for complete search history.

(56) References Cited

U.S. PATENT DOCUMENTS 6,097,430 A * 8/2000 Komiya ................. H04N 1/195
                                                                348/218.1
8,395,677 B2   3/2013 Kikuchi et al.
(Continued)

FOREIGN PATENT DOCUMENTS

EP          2421248 A2    2/2012
EP          2432227 A1    3/2012
(Continued)

OTHER PUBLICATIONS

Extended European Search Report issued in European Appln. No. 17001271.0 dated Nov. 14, 2017.
(Continued)

*Primary Examiner* — Nelson D. Hernández Hernández
(74) *Attorney, Agent, or Firm* — Rossi, Kimms & McDowell LLP

(57) ABSTRACT

An image processing apparatus performs image processing for correcting a lateral chromatic aberration that contains a rotationally symmetrical component and a shift component, for an input image generated by image capturing using an optical system. The image processing apparatus includes a first acquirer configured to acquire first component information on a first component that is one of the rotationally symmetrical component and the shift component, the first component information being acquired and stored before the input image is acquired, a second acquirer configured to acquire the second component information on a second component that is the other of the rotationally symmetrical component and the shift component based on the color shift amount, by using the input image and the first component information, and a corrector configured to perform a correction process with the first component information and the second component information for the input image.

18 Claims, 6 Drawing Sheets

(56) References Cited

U.S. PATENT DOCUMENTS

| | | |
|---|---|---|
| 8,446,477 B2 | 5/2013 | Irisawa et al. |
| 8,542,920 B2 | 9/2013 | Kano |
| 8,730,357 B2 | 5/2014 | Nishio et al. |
| 2012/0044369 A1* | 2/2012 | Irisawa .............. H04N 5/23248 |
| | | 348/208.4 |
| 2013/0308018 A1 | 11/2013 | Sasaki |
| 2018/0033121 A1* | 2/2018 | Ida ....................... H04N 1/6027 |

FOREIGN PATENT DOCUMENTS

| | | |
|---|---|---|
| JP | 2012023532 A | 2/2012 |
| JP | 5505135 B2 | 5/2014 |
| JP | 2015226158 A | 12/2015 |

OTHER PUBLICATIONS

Extended European Search Report issued in European Appln. No. 17001272.8 dated Nov. 13, 2017.

Copending U.S. Appl. No. 15/658,999, filed Jul. 25, 2017.

Office Action issued in U.S. Appl. No. 15/658,999 dated Sep. 18, 2018.

Office Action issued in U.S. Appl. No. 15/658,999 dated May 9, 2018.

Notice of Allowance issued in U.S. Appl. No. 15/658,999 dated Jan. 28, 2019.

\* cited by examiner

IMAGE PROCESSING APPARATUS THAT CORRECTS FOR LATERAL CHROMATIC ABERRATION, IMAGE CAPTURING APPARATUS, IMAGE PROCESSING METHOD, AND STORAGE MEDIUM

BACKGROUND OF THE INVENTION

Field of the Invention

The present invention relates to an image processing technology configured to correct a lateral chromatic aberration (or chromatic aberration of magnification) of an imaging optical system, in a captured image.

Description of the Related Art

A variety of aberrations of an optical system configured to form an object image in an image capturing apparatus, such as a digital camera, degrade the quality of a captured image. A lateral chromatic aberration among the variety of aberrations shifts one or more colors in the captured image. In the following description, the chromatic aberration causes a shift (color shift) of an imaged position for each color, and is expressed by a parallel movement of an object image for each pixel different from a blur caused by the imaging performance. Japanese Patent Laid-Open No. 2012-23532 discloses a method for detecting a lateral chromatic aberration correcting in a captured image and for correcting it through image processing. More specifically, this method detects the lateral chromatic aberration in a radial direction (or an image height or point direction) from an image center and corrects it.

As the image sensor used for the imaging apparatus includes more pixels and a unit pixel size reduces, the lateral chromatic aberration affects the image quality although this lateral chromatic aberration has not conventionally posed a substantial problem. For example, the image quality lowers when a change of the lateral chromatic aberration caused by a manufacturing error of an optical system is not corrected. Japanese Patent No. 5,505,135 discloses a method for correcting a lateral chromatic aberration caused by a manufacturing error by calculating a correction amount for a rotationally symmetrical component with respect to an image center and a correction amount for a shift component in which an amount and a direction of a color shift amount are uniform in an entire image, among the lateral chromatic aberration generated in the optical system which contains the manufacturing error. Japanese Patent Laid-Open No. 2015-226158 discloses a method for detecting a rotationally symmetrical component and a shift component in an optical system that has a manufacturing error based on a relationship between these components.

The manufacturing error of the optical system contains decentering and a tilt of a lens (a lens element and lens unit) relative to the optical axis in the optical system, a positional shift parallel to the lens optical axis direction, and a focal length shift caused by a shape and refractive index of a lens element, etc. An object image for each color is shifted mainly by the decentering and tilt of the lens, and a magnification of the object image for each color is shifted mainly by the positional shift parallel to the optical axis direction and the focal length shift of the lens. The method disclosed in Japanese Patent Laid-Open No. 2012-23532 varies a magnification in the image height direction for the correction, and cannot correct a lateral shift of the object image for each color caused by the decentering and tilt of the lens.

The method disclosed in Japanese Patent No. 5,505,135 considers the component of the lateral chromatic aberration which uniformly occurs in the entire image, and can correct a shift of the object image for each color.

However, this method detects the shift component based on the captured image that contains a chromatic magnification shift based on a designed value and a manufacturing error. This method cannot detect that a sagittal direction edge is not contained in a captured image unless the influence of the shift component caused by the color magnification shift is considered, where only the shift component occurs in the sagittal direction edge. The "sagittal direction edge" is an edge in which a luminance changes along the sagittal direction, and is orthogonal to a meridional direction edge in which a luminance changes in a radial direction.

Moreover, the method disclosed in Japanese Patent Laid-Open No. 2015-226158 also detects edges other than the sagittal direction edge based on the fact that any one of the rotationally symmetrical component and the shift component serves as an offset from the other of them. Thereby, the detection accuracy improves since the number of edges used to detect each component increases. However, when the captured image does not have a sufficient distribution of detected edges, one component cannot be distinguished from the other component and each component cannot be accurately estimated. Thus, the rotationally symmetrical component and the shift component cannot be accurately detected and consequently a sufficient correction cannot be provided.

SUMMARY OF THE INVENTION

The present invention provides an image processing apparatus, an image processing method etc., which can accurately and robustly correct a lateral chromatic aberration caused by a manufacturing error of an optical system.

An image processing apparatus according to one aspect of the present invention is configured to perform image processing on an input image generated by image capturing using an optical system for correcting a lateral chromatic aberration that contains a rotationally symmetrical component and a shift component. The image processing apparatus includes a first acquirer configured to acquire first component information on a first component that is one of the rotationally symmetrical component and the shift component, the first component information being acquired and stored before the input image is acquired, a second acquirer configured to acquire the second component information on a second component that is the other of the rotationally symmetrical component and the shift component by using the input image and the first component information, and a corrector configured to perform a correction process with the first component information and the second component information for the input image.

Further features of the present invention will become apparent from the following description of exemplary embodiments with reference to the attached drawings.

DESCRIPTION OF THE EMBODIMENTS

A description will be given of embodiments according to the present invention with reference to the accompanying drawings.

Initially, prior to a description of a specific embodiment, a description will be given of a generating mechanism of a lateral chromatic aberration caused by a manufacturing error of an image capturing optical system (simply referred to as an "optical system" hereinafter). As described above, the manufacturing error of the optical system contains decentering and a tilt of a lens (a lens element and lens unit) relative to an optical axis in the optical system, a positional shift parallel to the lens optical axis direction and a focal length shift caused by a shape and a refractive index of the lens element, etc.

In the optical system that is rotationally symmetrical with respect to the optical axis, the lateral chromatic aberration is rotationally symmetrical. As the lens decenters or tilts, a rotationally asymmetrical lateral chromatic aberration specific to a decentering optical system occurs. When the lens unit partially decenters or tilts, an image plane formed by the optical system shifts on the basis of an object plane in a direction orthogonal to the optical axis. At this time, since a shift amount changes for each wavelength due to the dispersion of the decentering lens unit, each color shifts with a uniform amount and a uniform direction on the entire image plane (imaging plane).

Figure 1A:
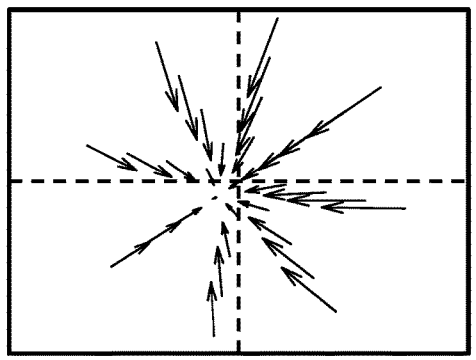
FIGS. 1A to 1E are views for explaining a lateral chromatic aberration caused by a manufacturing error according to one embodiment of the present invention.
Figure 1B:
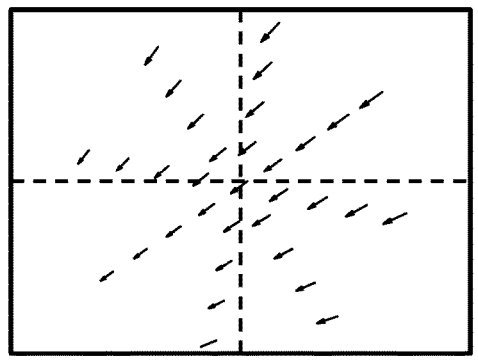

As a position shifts parallel to the optical axis direction of the lens and a focal length shifts due to the shape and refractive index of the lens element, the magnification of the object image and the rotationally symmetrical aberration component change. At this time, a variation amount changes for each wavelength due to the dispersion of the shift causing lens unit, and thus a, a position shifts rotationally symmetrically for each color. In the actual optical system, a color shift occurs in each of a plurality of lenses, and a lateral chromatic aberration with a complicated pattern consequently occurs. FIGS. 1A and 1B illustrate illustrative lateral chromatic aberration patterns. FIG. 1A illustrates an illustrative pattern of a lateral chromatic aberration when a manufacturing error is provided to an optical system that is designed to be rotationally symmetrical with respect to the optical axis. Each vector illustrated by an arrow in FIG. 1A represents an amount and direction of a lateral chromatic aberration at a start position of the vector. When a RGB image is generated as a captured image by image capturing, different patterns appear between RG and between BG. Originally, in the rotationally symmetrical optical system, the optical axis center coincides with the imaging plane center, and a lateral chromatic aberration pattern occurs around it as a symmetrical center. However, the lateral chromatic aberration has an asymmetrical pattern over a range of the imaging plane in FIG. 1A.

FIG. 1B illustrates a lateral chromatic aberration pattern after the lateral chromatic aberration pattern illustrated in FIG. 1A is corrected based on the lateral chromatic aberration component on the designed value. After the lateral chromatic aberration component on the designed value is corrected, similar to the pre-correction pattern, the lateral chromatic aberration still has an asymmetrical pattern over the entire imaging plane. This residue corresponds to the lateral chromatic aberration component caused by the manufacturing error. A correction residue occurs as illustrated in FIG. 1B in the conventional lateral chromatic aberration that does not consider the manufacturing error, and thus the captured image degrades.

Figure 1C:
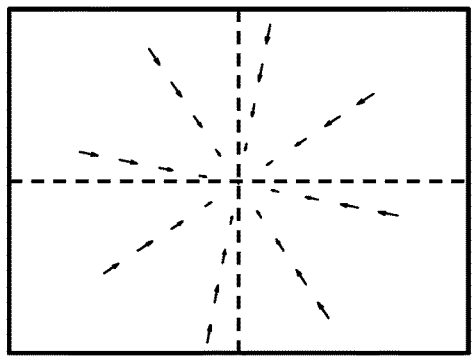
Figure 1D:
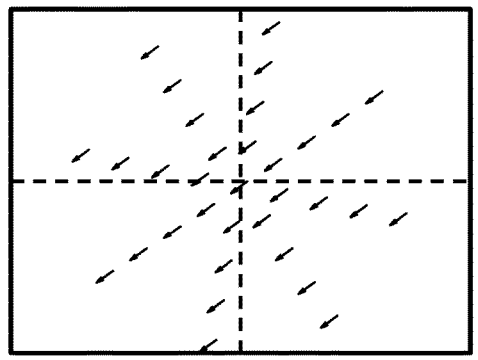
Figure 1E:
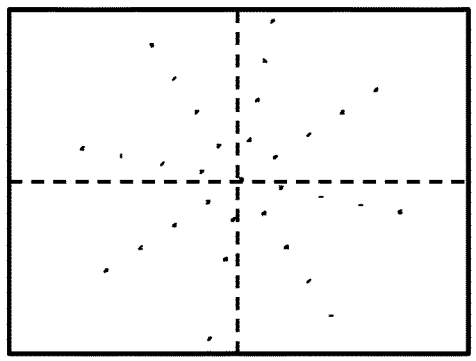

The lateral chromatic aberration pattern after the lateral chromatic aberration component on the designed value is corrected can be approximated as a sum of a rotationally symmetrical component illustrated in FIG. 1C and a shift component having a color shift vector illustrated in FIG. 1D that is uniform in the entire imaging plane. For example, when only the lens decentering and tilt are considered the manufacturing error, the shift component illustrated in FIG. 1D can be corrected but the rotationally symmetrical component illustrated in FIG. 1C is left after the correction. Thus, the lateral chromatic aberration of the actual optical system which contains the manufacturing error can be approximated as a sum of a rotationally symmetrical component and a shift component that is uniform in the captured image. The rotationally symmetrical component is a sum of the component on the designed value and the component caused by the manufacturing error. When the correction is made based on the above components, the lateral chromatic aberration can be accurately corrected, as illustrated in FIG. 1E.

Next follows an algorism for detecting the lateral chromatic aberration. A description will now be given of a method for acquiring a lateral chromatic aberration amount (color shift amount) between a G plane and an R plane as two color components (color planes) in an input image as a captured image, but this method is similarly applicable to an acquisition of the lateral chromatic aberration amount between other color planes. Initially, a known method generates color plane image data for the G plane and the R plane in an input image 200, and detects an edge based on each generated color plane image. The edge can be detected, for example, by searching for an area in which a difference (increase or decrease value) between adjacent pixels is equal to or higher than a predetermined value where pixel values in continuous pixels monotonously increase or decrease.

Next, a color shift amount is obtained in an edge portion that is an area containing the detected edge and its surrounding area, by searching a position that provides a maximum correlation between the color plane image data. For example, by moving a position of the R plane image data relative to a position of the G plane image data, a moving amount may be calculated which reduces an absolute value or a square sum of a difference of a luminance value between the two color plane image data, and the calculated moving amount may be set to a color shift amount. Since a color shift is not detected from the input image in a direction parallel to the edge in the edge portion, a color shift amount may be obtained only in one direction or in a direction orthogonal to the edge.

In an area outside the edge portion, a color shift amount can be two-dimensionally searched but a processing burden becomes heavier than the one-dimensional search. The color shift caused by the lateral chromatic aberration in the optical system remarkably appears in the edge in the image data, and may be detected in the edge portion.

When the color shift direction is known as in the method disclosed in Japanese Patent Laid-Open No. 2012-23532, the color shift amount can be easily obtained by detecting the color shift amount along the direction parallel to the color shift direction in the edge orthogonal to the color shift direction.

When the lateral chromatic aberration can be expressed as a sum of a rotationally symmetrical component and a shift component, a sum of these two components is detected at each position on the input image. When the input image has a sufficient distribution of detected edges, these components can be separated from each other but when the image has an insufficient distribution of detected edges, these components cannot be accurately separated. This problem will be described with reference to FIGS. 2A to 2D.

Figure 2A:
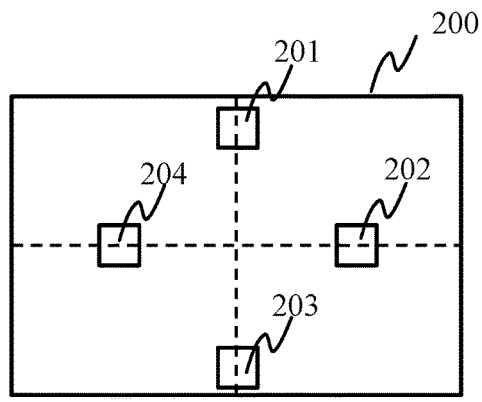
FIGS. 2A to 2F are views illustrating a detection result of a color shift according to this embodiment.
Figure 2B:
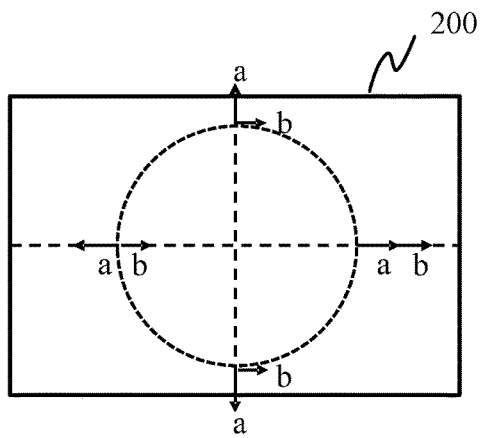

For example, assume that the same number of meridional direction edges is detected in each of four areas (edge portions) 201 to 204 at almost the same image height on the input image 200 illustrated in FIG. 2A. A color shift amount may be detected at a plurality of positions in one edge, and the same number of edges means the number of detections of the color shift amount in each area, rather than the number of edges themselves. In this example, as illustrated in FIG. 2B, rotationally symmetrical components at the image height in the areas 201 to 204 have a color shift amount of "+a" where the radial outward direction is set to positive, and shift components have a color shift amount of "b" where the horizontal rightward direction is set to positive.

Figure 2C:
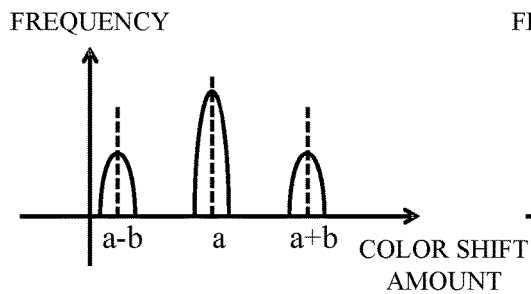

FIG. 2C illustrates a frequency distribution obtained by aggregating detection results of the color shift amounts in respective areas, where the radial outward direction is set to positive. In the areas 201 and 203, the meridional direction edge is not affected by the shift component. Therefore, the detected color shift amount distributes around "+a" although detections scatter. In the area 202, the shift component and the rotationally symmetrical component point to same direction, and thus the detected color shift amount distributes around "a+b." In the area 204, the shift component and the rotationally symmetrical component point to opposite directions and the detected color shift amount distributes around "a−b." Based on these facts, the rotationally symmetrical component is calculated as "a" based on an average over the imaging plane, and a horizontal component of the shift component is calculated as "+b" in the rightward direction based on a difference between the color shift amount and the rotationally symmetrical component detected in the areas 202 and 204.

Figure 2D:
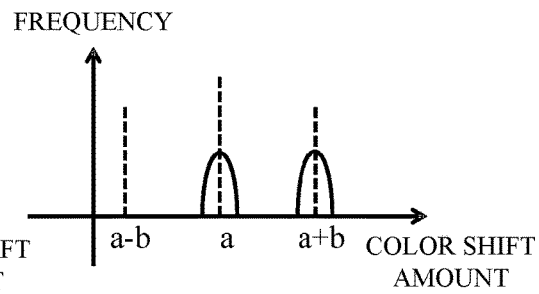

FIG. 2D illustrates a color shift amount histogram where the areas 203 and 204 do not contain any edges used to detect the color shift amount. Since no edges are detected in the areas 203 and 204, the frequency becomes half around "a" and disappears around "a−b." When the shift component and the rotationally symmetrical component are calculated based on the average of both areas 201 and 202 in which edges are detected, the rotationally symmetrical component becomes "a+b/2." The shift component is calculated as "b/2" in the rightward direction and "b/2" in the downward direction based on a difference between the detected color shift amount and rotationally symmetrical component. In this way, when the lateral chromatic aberration is corrected based on the calculated color shift amount, the areas 201 and 202 are properly corrected but other areas 203 and 204 are erroneously corrected.

In order to accurately detect the color shift, the detection is performed in the edge portion but the color shift also occurs in the non-edge portion. When the input image is corrected with an amount and a direction of the erroneously detected color shift amount, an output corrected image has a degraded color shift. When edges used to detect a color shift do not sufficiently distribute, the shift component and the rotationally symmetrical component are not uniquely determined and the detection error occurs.

Figure 2E:
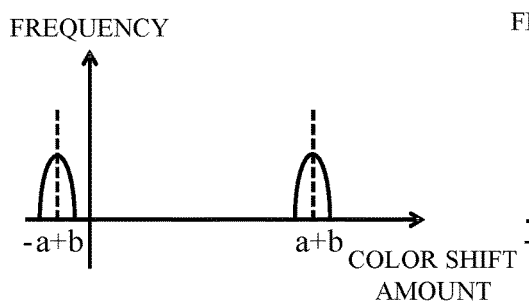

A similar problem occurs when the shift component is calculated in advance, as illustrated in FIG. 2E. In FIG. 2E, the same color shift amounts are detected as those in FIG. 2C, but FIG. 2E sets the horizontal rightward direction to positive and illustrates the frequency distribution only for the areas 202 and 204 in which the horizontal component is detected from the meridional direction edge. The shift component is calculated as "b" in the rightward direction based on the average in the areas 202 and 204, and the rotationally symmetrical component is calculated as "+a" in the radial outward direction based on the difference between the shift component and the color shift amount detected in the areas 201 to 204.

Figure 2F:
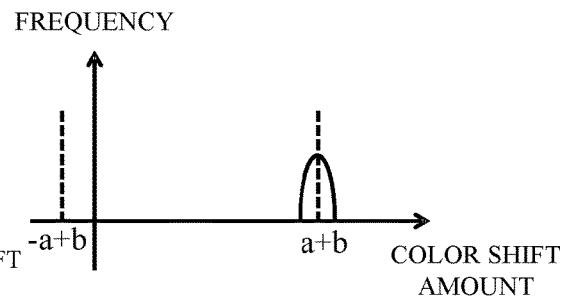

FIG. 2F illustrates a histogram where there are no edges used to detect the color shift amount in the areas 203 and 204, similar to FIG. 2D. Since no edges are detected in the area 204, there is no distribution around "−a+b." When the shift component and the rotationally symmetrical component are calculated based on the averages of both areas 201 and 202 in which the edges are detected, the shift component is calculated as "a+b." Since the color shift amount detected in the area 202 is "a+b," the rotationally symmetrical component becomes zero. Moreover, the rotational symmetrical component has a color shift amount of "+a" detected in the area 201 in the radial outward direction, and the perpendicular component in the shift component is calculated as "+a" in the upward direction. Where there is not a sufficient distribution of edges used to detect the color shift, the detection error occurs similar to a case where the rotationally symmetrical component is calculated in advance.

As described above, when the lateral chromatic aberration contains the rotationally symmetrical component and the shift component, the detection error occurs where there is not a sufficient distribution of edges on the input image. Hence, when both of a rotationally symmetrical component and a shift component are detected in an input image having a lateral chromatic aberration that contains the rotationally symmetrical component and the shift component, a problem occurs different from a case where the lateral chromatic aberration is detected in an input image having only a rotationally symmetrical component and a detection accuracy may degrade.

In addition, in order to accurately correct the lateral chromatic aberration in the optical system that has a manufacturing error, a rotationally symmetrical component and a shift component may be measured in the manufacturing process and stored as a data table. However, the manufacturing process has a heavier measuring burden if it handles all image capturing conditions, such as a zoom position, F-number, an image capturing distance, which changes a state of the optical system. In order to lessen the measuring burden, it is conceivable to measure the components with discrete image capturing conditions and to calculate the lateral chromatic aberration at a desired image capturing condition through an interpolation. However, the rotationally symmetrical component caused by the manufacturing error or the shift component caused by the manufacturing error may abruptly change in some optical systems. It may be possible to maintain a sufficient accuracy for one component through an interpolation but it may be difficult to maintain a sufficient accuracy for the other component through the interpolation.

The shift component may change depending on whether the image capturing apparatus is held in a lateral orientation or a longitudinal orientation in image capturing. The manufacturing process has difficulties in handling all image capturing conditions. It is difficult for the method for storing both of the rotationally symmetrical component and the shift component in the data table to accurately correct the lateral chromatic aberration in the optical system having a manufacturing error.

As described above, the embodiment according to the present invention performs image processing for correcting the lateral chromatic aberration caused by the rotationally symmetrical component and the shift component, for the input image generated by the image capturing using the optical system. One of the rotationally symmetrical component and the shift component will be referred to as a first component, and the other of the rotationally symmetrical component and the shift component will be referred to as a second component. Then, this embodiment obtains first component information as information on the first component obtained and stored before the input image is obtained and second component information as information on the second component by using the input image and the first component information. Each component information contains an amount and direction of each component. The corrected image is generated by performing a correction process using the first component information and second component information for the input image.

When the lateral chromatic aberration is corrected based on its rotationally symmetrical component and shift component, the lateral chromatic aberration containing a component caused by the manufacturing error can be corrected. However, the above detection error problems occur in detecting the lateral chromatic aberration based on the input image, where the lateral chromatic aberration can be approximated by a model that includes the rotationally symmetrical component and the shift component.

Accordingly, this embodiment calculates the second component information based on the first component image that has been previously obtained and stored or before the input image is obtained, and the input image, and the lateral chromatic aberration information obtained (detected) from the input image, and thereby can robustly detect the second component different from the first component. Then, this embodiment performs the correction process for the input image using the second component information and the first component information, and can accurately correct the lateral chromatic aberration containing the component caused by the manufacturing error. Herein, "previously obtaining" means, for example, obtaining and storing in the manufacturing process of the optical system used to obtain the input image.

In order to obtain the second component information using the first component information, the lateral chromatic aberration information may be obtained by detecting the lateral chromatic aberration in the input image and the second component information may be calculated with the first component information and the lateral chromatic aberration information. More specifically, the first component information (an amount of first component) may be subtracted from the lateral chromatic aberration (lateral chromatic aberration amount). In this case, the correction process is performed for the input image using the first component information and the second component information.

Another method for obtaining the second component information using the first component information may generate an intermediate corrected image by performing a correction process for the input image using the first component information, and obtain the second component information by detecting a color shift amount (second component) in the intermediate corrected image. In this case, the final corrected image can be generated by performing the correction process for the intermediate corrected image using the second component information.

The first component may be the rotationally symmetrical component and the second component may be the shift component. When information on the rotationally symmetrical component previously stored as the first component information is obtained, an unknown component is limited to the shift component. Thereby, an amount of each component in the detected color shift amount (lateral chromatic aberration amount) can be determined, and the lateral chromatic aberration can be robustly and accurately detected while the above detection error is prevented.

The first component information may be limited to information on the rotationally symmetrical component on the designed value of the optical system. Thereby, the rotationally symmetrical component can be acquired without measuring the manufacturing process. In an input image generated by image capturing with an optical system that is not substantially affected by a rotationally symmetrical component caused by a manufacturing error, an unknown component is limited to the shift component. Thus, the lateral chromatic aberration can be robustly and accurately detected while the above detection error is prevented, by calculating the shift component based on the rotationally symmetrical component obtained based on the detection result by the detector.

The first component may information on the rotationally symmetrical component on the designed value and the rotationally symmetrical component caused by the manufacturing error. Thereby, an unknown component can be limited to the shift component. In an input image generated by image capturing with an optical system that has a manufacturing error, there are a rotationally symmetrical component caused by the manufacturing error and a shift component caused by the manufacturing error in addition to a rotationally symmetrical component on the designed value. In other words, in general, a lateral chromatic aberration caused by a manufacturing error contains a rotationally symmetrical component and a shift component. Unless one of them is obtained from the previously stored value, the above detection error occurs. Accordingly, in order to limit the unknown component to the shift component, the rotationally symmetrical components on the designed value and caused by the manufacturing error may be obtained from previously stored information. When the rotationally symmetrical component is stored and the shift component is not stored, a stored data amount can be saved. In this case, when the rotationally symmetrical component is stored as a sum of the rotationally symmetrical component on the designed value and the rotationally symmetrical component caused by the manufacturing error, the lateral chromatic aberration caused by the manufacturing error is stored and a stored data amount does not become larger than that for a case where the manufacturing error is not considered.

Even when the shift component caused by the manufacturing error is measured and stored in the manufacturing process, a measured value or an interpolated value based on measured values may not be available due to a characteristic of an optical system, an image capturing condition (such as a zoom position, an F-number, and an image capturing distance), an orientation of the image capturing apparatus in image capturing, etc. In this case, the lateral chromatic aberration can be accurately and robustly detected while the detection error is prevented, by calculating the shift component based on the previously obtained rotationally symmetrical component and the detected lateral chromatic aberration amount or by detecting the shift component based on the intermediated image. As a result, the lateral chromatic aberration caused by the manufacturing error can be accurately corrected.

The first component may be the shift component and the second component may be the rotationally symmetrical component. When the previously stored shift component is obtained as the first component, the unknown component is limited to the rotationally symmetrical component. Each component amount can be determined in the detected lateral chromatic aberration amount, and the lateral chromatic aberration can be accurately and robustly detected while the above detection error is prevented.

In this case, the first component information may be information on the shift component caused by the manufacturing error in the optical system. Thereby, the unknown component is limited to the rotationally symmetrical component. In an input image generated by image capturing with an optical system that has a manufacturing error, there are a rotationally symmetrical component caused by a manufacturing error and the shift component caused by a manufacturing error in addition to a rotationally symmetrical component on a designed value. In other words, in general, the lateral chromatic aberration caused by the manufacturing error contains the rotationally symmetrical component and the shift component. Unless one of them is obtained from the previously stored value, the above detection error occurs. Accordingly, in order to limit the unknown component to the rotationally symmetrical component, the shift component caused by the manufacturing error may be obtained from previously stored information. When only the shift component caused by the manufacturing error is stored, it is unnecessary to store the rotationally symmetrical component and a stored data amount can be saved. Since the shift component has a color shift having a uniform direction and a uniform amount over the entire input image, the shift component can be stored with a stored data amount smaller than that for the rotationally symmetrical component having a different direction and a different amount depending on the image height. Of course, it is unnecessary to store both of the rotationally symmetrical component on the designed value and the rotationally symmetrical component caused by the manufacturing error or it is unnecessary to store only the rotationally symmetrical component caused by the manufacturing error. Even in the latter case, a stored data amount can be smaller than that for a case where the rotationally symmetrical component on the designed value and the rotationally symmetrical component caused by the manufacturing error are separately stored.

Even where the rotationally symmetrical component caused by the manufacturing error is measured and previously stored in the manufacturing process, a measured value or an interpolated value based on measured values may not be available due to a characteristic of an optical system, an image capturing condition (such as a zoom position, an F-number, and an image capturing distance), an orientation of the image capturing apparatus in image capturing, etc. In this case, the lateral chromatic aberration can be accurately and robustly detected while the above detection error is prevented, by calculating the rotationally symmetrical component based on the lateral chromatic aberration amount detected based on the previously obtained shift component or by detecting the rotationally symmetrical component based on the intermediated image. As a result, the lateral chromatic aberration caused by the manufacturing error can be accurately corrected.

Since the shift component and the rotationally symmetrical component caused by the manufacturing error are different for each individual optical system, the first component information may be individually measured and stored in the manufacturing process of the optical system, as described above. Instead of the manufacturing process, the first component information may be stored in the adjustment process, such as repairing. The detection from the input image has the above problem and contains the above detection error, but this problem can be solved by measuring the ideal measurement environment in the manufacturing process.

The first component information may be calculated from an image for acquiring information different from the input image to be corrected. The image for acquiring information different from the input image contains, for example, an image obtained by imaging an object as a known chart. In general, the lateral chromatic aberration depends on an image capturing condition of an optical system in image capturing, a color temperature of environmental light, etc., and thus may be detected from the input image to be corrected. However, when the lateral chromatic aberration contains the rotationally chromatic aberration and the shift component, the above detection error is likely to occur, the detection accuracy degrades and the detection error occurs depending on the input image. For example, when the edge contrast or the number of edges are insufficient, the detection accuracy is likely to degrade, and the colored object is affected so that the color shift is erroneously detected. Accordingly, the first component information may be measured using the properly detected image for acquiring information as an image different from the input image.

The image for acquiring information may be an image obtained by imaging a known chart. The detection error occurs when a target area does not have sufficient edges. The image for acquiring information having sufficient edges can be obtained by using the known chart. In addition, the chart may contain a meridional direction edge, a sagittal direction edge, a horizontal edge in which a luminance changes in a perpendicular direction, and a perpendicular edge in which a luminance changes in a horizontal edge arranged at appropriate positions with appropriate numbers. This configuration can measure a color shift amount in a direction suitable for a component of the lateral chromatic aberration to be measured, and a color shift amount that does not contain a specific component, preventing the above detection error. In order to accurately measure an asymmetrical lateral chromatic aberration in the image for acquiring information, the chart may contain symmetrically arranged edges as a whole. Since a component of the lateral chromatic aberration caused by the manufacturing error depends on an individual difference of the optical system, the component is measured and stored in the ideal environment. Thereby, the component information is applicable to a general captured image obtained by later image capturing.

The image for acquiring information may be an image obtained by image capturing with an image capturing apparatus different from an interchangeable optical system (interchangeable lens apparatus) used for capturing and obtaining the input image and the image capturing apparatus used for the image capturing. In order to measure the component of the lateral chromatic aberration caused by the manufacturing error of the optical system, it is necessary to use the image for acquiring information obtained by image capturing with the optical system to be measured. Where the optical system is provided into the interchangeable lens apparatus, the image capturing apparatus to which the optical system is attached may be different from the image capturing apparatus used to obtain the input image. In general, the component of the lateral chromatic aberration caused by the manufacturing error is smaller than a component on the designed value, and thus an image capturing apparatus that can provide good image capturing with a higher resolution, a higher gradation, and a low noise than the image capturing apparatus used to acquire the input image may be used.

The first component information may be obtained by measuring an optical configuration (arrangement, refractive index, and shape) of optical elements in the optical system used to capturing and obtain the input image. The lateral chromatic aberration is originally determined by the optical configuration, such as an arrangement of the optical elements in the optical system, the refractive index of each optical element, and the shape of each optical element. Thus, the first component information can be previously obtained and stored by measuring the optical configuration.

When the second component information is calculated by subtracting the first component information from the detected lateral chromatic aberration information, the second component information may be calculated based on the aggregate result that is obtained by aggregating subtraction results at a plurality of positions on the input image. In other words, the second component information is calculated through a statistic process, such as averaging, after the color shift amounts obtained by subtractions at a plurality of positions (edge portions) are aggregated. Thereby, the lateral chromatic aberration can be accurately and robustly detected while the above detection error is prevented.

An error preventive process may be performed for the above aggregate result. The error preventive process is a process for preventing an erroneous value in the detection based on the aggregate result. The error preventive process includes a process that excludes a detection value having a difference from an average value in a detected color shift amount histogram larger than a predetermined threshold, a process that does not use the aggregate result corresponding to a histogram having a dispersion larger than a threshold, etc. Where the lateral chromatic aberration contains the rotationally symmetrical component and the shift component, the detected color shift amount contains these two components and the detected value scatters as illustrated in FIGS. 2C to 2F. Therefore, the erroneous value cannot be prevented with the dispersion by simply aggregating detection results from the input image.

Figure 3A:
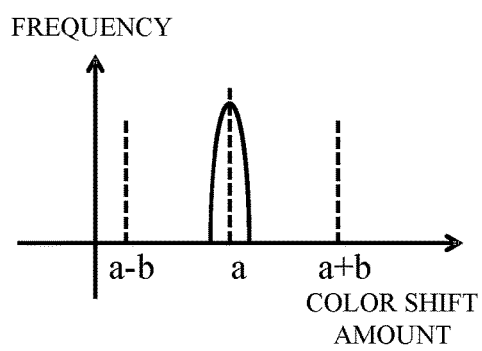
FIGS. 3A and 3B are views a color shift aggregate result obtained by subtracting first component information according to the embodiment.
Figure 3B:
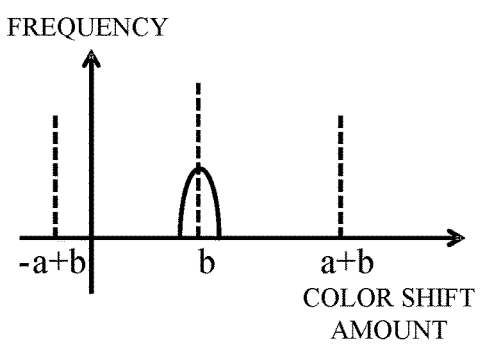

However, only the second component information can be aggregated by aggregating the results after the first component information is subtracted from the detected lateral chromatic aberration information, and the erroneous value can be avoided. For example, assume that information of the shift component as the first component information is obtained in FIG. 2D that illustrates a histogram of a detection result of the lateral chromatic aberration information (color shift amount). When the obtained shift component information is subtracted from the color shift amount detection result, a distribution of only the rotationally symmetrical component is obtained as illustrated in FIG. 3A. Similarly, where the rotationally symmetrical component information is obtained as the first component information subtracted from the color shift amount detection result as illustrated in FIG. 2F, a distribution of only the shift component is obtained as illustrated in FIG. 3B. Thus, when an aggregate result only for one component information is obtained, an erroneous value can be prevented with the dispersion since scattering of the detection result caused by the two components can be prevented.

Where the first component information is a shift component and the second component information is a rotationally symmetrical component, an aggregate result may be corrected with information of a rotationally symmetrical component for preventing an error, which is previously obtained in the manufacturing process etc. before the input image is obtained. The rotationally symmetrical component for preventing the error is a rotationally symmetrical component on a designed value. Where the rotationally symmetrical component caused by the manufacturing error can be obtained, the rotationally symmetrical component for preventing the error may use a sum of the rotationally symmetrical component on the design value and the rotationally symmetrical component caused by the manufacturing error.

Japanese Patent Laid-Open No. 2012-23532 discloses a method for correcting a detection result based on data of a lateral chromatic aberration on the designed value so as to prevent a detection error with an input image obtained by capturing a colored object. Where the lateral chromatic aberration contains the shift component, the detected color shift amount itself cannot be compared with the data of the lateral chromatic aberration on the designed value and thus the correction based on the data of the lateral chromatic aberration on the designed value is not available. The correction based on the data of the designed value component is available by correcting, based on the rotationally symmetrical component for preventing the error, the aggregate result obtained by subtracting and aggregating the previously obtained first component information from the detected color shift amount.

When an interchangeable lens apparatus includes the optical system and is interchangeable to an image capturing apparatus, the interchangeable lens apparatus may include a lens storage unit configured to store the first component information and the interchangeable lens apparatus may supply the first component information to the image processing apparatus or the image capturing apparatus that includes the image processing apparatus. Thereby, it is unnecessary to store the first component information for a variety of optical systems in the image processing apparatus or the image capturing apparatus. In addition, this configuration can correct the lateral chromatic aberration caused by the manufacturing error for the input image obtained by the image capturing apparatus mounted with the interchangeable lens apparatus.

The first component information may be stored as header information in the input image, and the image processing unit (apparatus) or the image capturing apparatus that includes the image processing unit may obtain the first component information from the header information. Thereby, it is unnecessary for the image processing apparatus or the image capturing apparatus having the same to store the first component information under a variety of image capturing conditions.

First Embodiment

Figure 4:
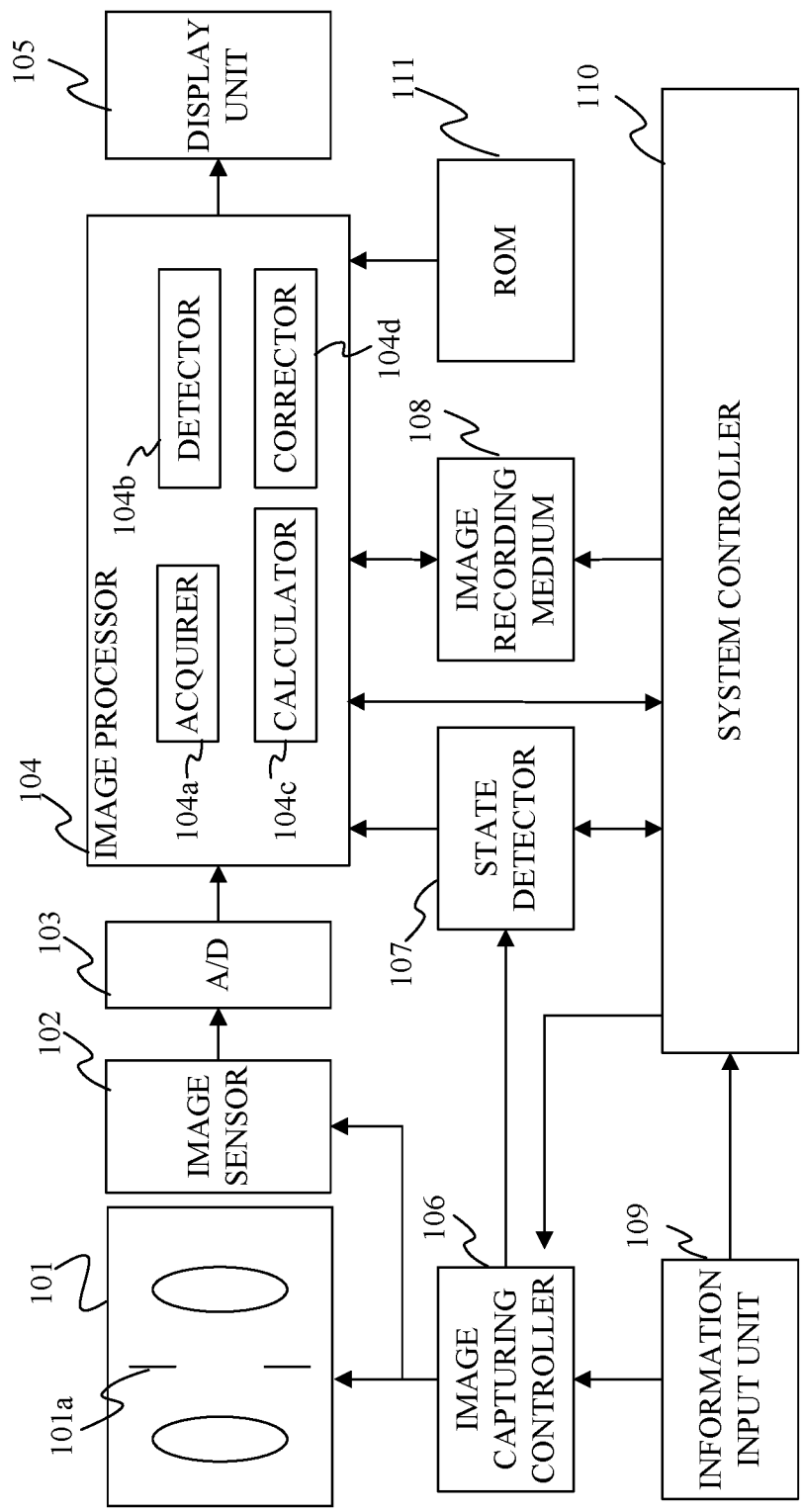
FIG. 4 is a block diagram of a configuration of an image processing apparatus according to a first embodiment.

FIG. 4 illustrates a configuration of an image capturing apparatus that includes an image processing apparatus according to a first embodiment of the present invention. An image capturing unit includes an (image capturing) optical system 101 and an image sensor 102. The optical system 101 includes a diaphragm 101a and images light from an unillustrated object on the image sensor 102. The image sensor 102 includes a photoelectric conversion element, such as a CCD sensor and a CMOS sensor, photoelectrically converts the object image (optical image) formed by the optical system 101 and outputs an analog image signal.

The analog signal generated by the photoelectric conversion by the image sensor 102 is converted into a digital image signal by an A/D converter 103, and output to an image processor 104 as an image processing apparatus. The image processor 104 performs general image processing for the digital image signal, generates an input image as a captured image, and performs image processing for correcting the lateral chromatic aberration corresponding to the manufacturing error of the optical system 101.

Figure 5:
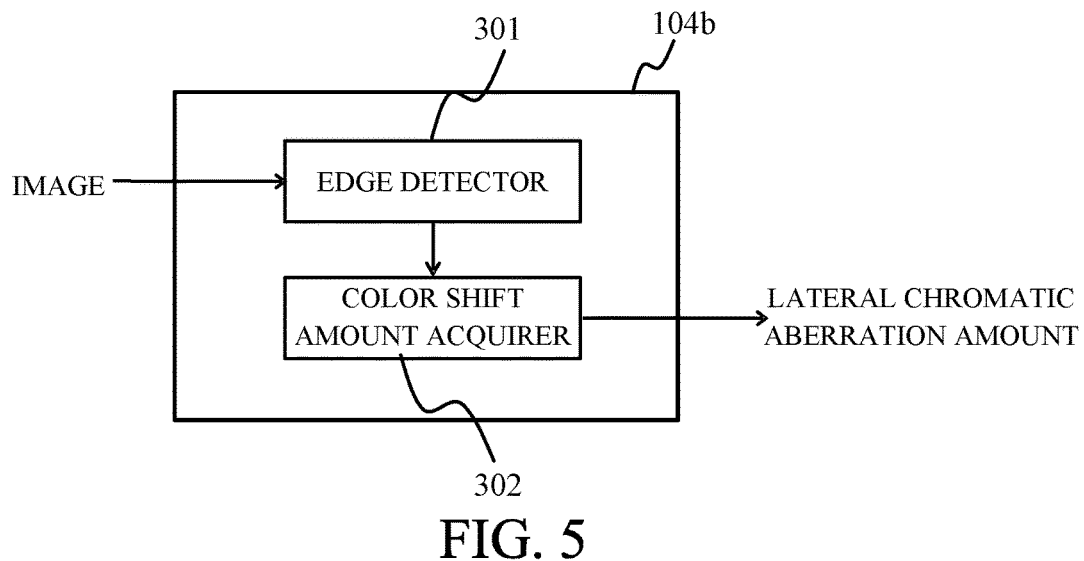
FIG. 5 is a block diagram of a detector according to the first embodiment.

The image processor 104 includes an acquirer (first acquirer) 104a, a detector 104b, a calculator 104c, and a corrector 104d. The acquirer 104a reads from a ROM 111 as a storage unit (and performing an interpolation calculation which will be described later) and acquires first component information that is information of one of the rotationally symmetrical component and shift component in the lateral chromatic aberration. The detector 104b detects a lateral chromatic aberration amount that is a total amount of a rotationally symmetrical component and a color shift amount in the input image. The detector 104b includes, as illustrated in FIG. 5, an edge detector 301, and a color shift amount acquirer 302.

The calculator 104c calculates second component information that is information of the other of the rotationally symmetrical component and the shift component in the lateral chromatic aberration, based on the first component information obtained by the acquirer 104a and the lateral chromatic aberration amount detected by the detector 104b. The detector 104b and the calculator 104c constitute a second acquirer. The corrector 104d generates a corrected image by performing a correction process for correcting the lateral chromatic aberration, for the input image, using the first component information and the second component information.

An output image as a corrected image generated by the image processor 104 or an output generated by performing another image process for the corrected image are stored in the image storage medium 108, such as a semiconductor memory and an optical disc. In this case, the first component information and the second component information may be written in an output image file. The output image may be displayed on a display unit 105.

An information input unit 109 detects information that is an image capturing condition, such as an F-number and an exposure time period, selected and input by a user, and supplies the data to a system controller 110. An image capturing controller 106 moves an unillustrated focus lens in the optical system 101 in accordance with a driving command from an system controller 110, controls the F-number, the exposure time period, and the operation of the image sensor 102, and captures the object image.

A state detector 107 obtains information of the current image capturing condition in accordance with an image capturing condition acquiring command from the system controller 110. The image capturing condition contains an F-number, a zoom position, a focus position, and an exposure time period in of the optical system 101, and an ISO speed of the image sensor 102, etc. The optical system 101 may be integrally provided to the image capturing apparatus (image sensor 102) or an interchangeable lens apparatus that is interchangeable to the image capturing apparatus. When the optical system 101 is provided to the interchangeable lens apparatus, the ROM 111 may be provided to the interchangeable lens, and the acquirer 104a in the image capturing apparatus can obtain information of the first component amount through a communication between the interchangeable lens apparatus and the image capturing apparatus. Even in this case, at least part of function of the ROM 111 may be provided to the image capturing apparatus.

Figure 6:
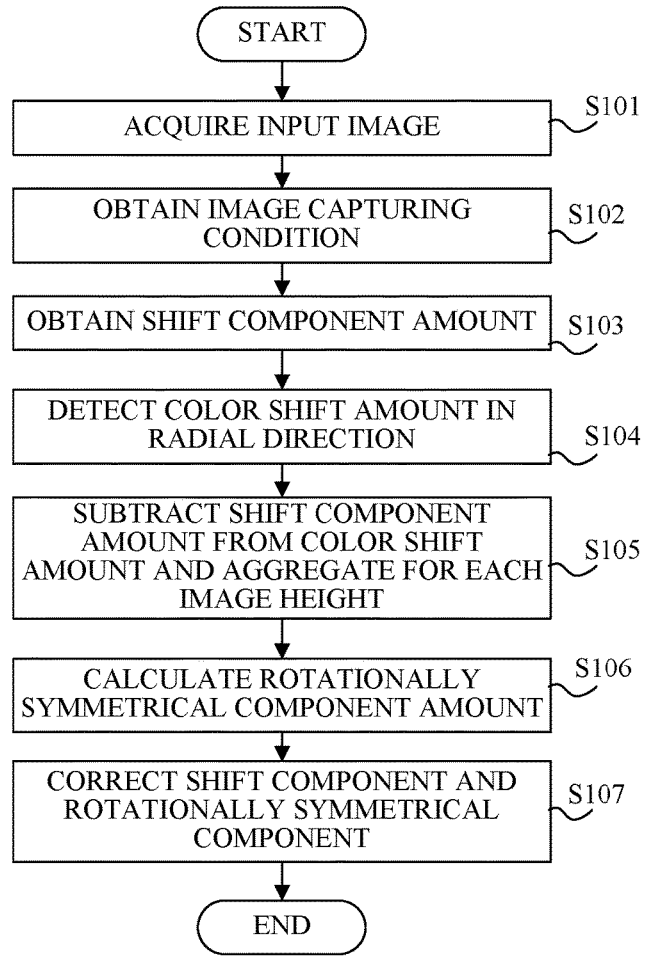
FIG. 6 is a flowchart of image processing according to the first embodiment.

A flowchart in FIG. 6 illustrates a flow of image processing (an image processing method) for correcting the lateral chromatic aberration according to this embodiment. The system controller 110 as a main computer and the image processor 104 as an image processing computer execute this process in accordance with an image processing program as a computer program. This process may not be necessarily executed on the software in the computer, and at least one processor or circuit may execute each function in the image processor 104.

In the step S101, the system controller 110 controls the image capturing unit that includes the optical system 101 and the image sensor 102 so that the image capturing unit captures the object image, and instructs the image processor 104 to generate an input image.

In the step S102, the system controller 110 obtains information of the current image capturing condition through the state detector 107.

In the step S103, the image processor 104 (acquirer 104a) obtains from the ROM 111, first component information corresponding to the image capturing condition obtained in the step S102. This embodiment obtains as the first component information, information of an amount and direction of the shift component (collectively referred to as a "shift component amount" hereinafter) caused by the manufacturing error in the lateral chromatic aberration.

The ROM 111 stores, as a data table, information of the shift component amounts under a plurality of representative image capturing conditions measured in the manufacturing process of the optical system 101 (or before the input image is obtained). The image processor 104 performs an interpolation process using shift component amounts under at least two representative image capturing conditions near the current image capturing condition, and calculates and obtains the shift component amount corresponding to the current image capturing condition. The shift component amount is expressed by a two-dimensional vector between R and G and between B and G, but its actual size is stored in the ROM 111 when the interchangeable lens apparatus includes the ROM 111. In this case, the image processor 104 converts the shift component amount read out of the ROM 111 into the shift amount in a pixel unit based on the pixel size information in the image sensor 102.

In the step S104, the edge detector 301 in the image processor 104 (detector 104b) detects a meridional direction edge (that includes an edge in a direction close to the meridional direction) on the input image obtained in the step S101. The color shift amount acquirer 302 obtains (detects) a lateral chromatic aberration amount (lateral chromatic aberration information representing a total amount of the rotationally symmetrical component and the shift component) as a color shift amount in the meridional direction in each edge portion that contains these edges.

In the step S105, the image processor 104 (calculator 104c) subtracts the shift component amount obtained in the step S103 from the lateral chromatic aberration amount obtained in the step S104, and thereby obtains a color shift amount that is equal at an equal image height. This color shift amount corresponds to an amount of the rotationally symmetrical component for each image height (position). The calculator 104c obtains the aggregate result by aggregating the color shift amounts in a predetermined range of the image height.

In the step S106, the calculator 104c calculates the rotationally symmetrical component amount at each image height in the input image based on the aggregate result of the color shift amount obtained in the step S105. More specifically, the image processor 104 uses a known method and calculates the rotationally symmetrical component amount for each image height, such as a method for averaging the aggregate results of the color shift amounts in the image azimuths and for approximating a change of the color shift amount for the image height, with a polynomial. The calculator 104c performs the above error preventive process and the correction based on the data of the designed value component for the calculated result, and calculates the rotationally symmetrical component amount as the second component information.

In the step S107, the image processor 104 (corrector 104d) performs a correction process (which may be a known correction process) for correcting the lateral chromatic aberration, for the input image, using the shift component amount obtained in the step S103 and the rotationally symmetrical component amount calculated in the step S106, thereby generating a corrected image in which the lateral chromatic aberration caused by the manufacturing error has been accurately corrected.

Second Embodiment

Figure 7:
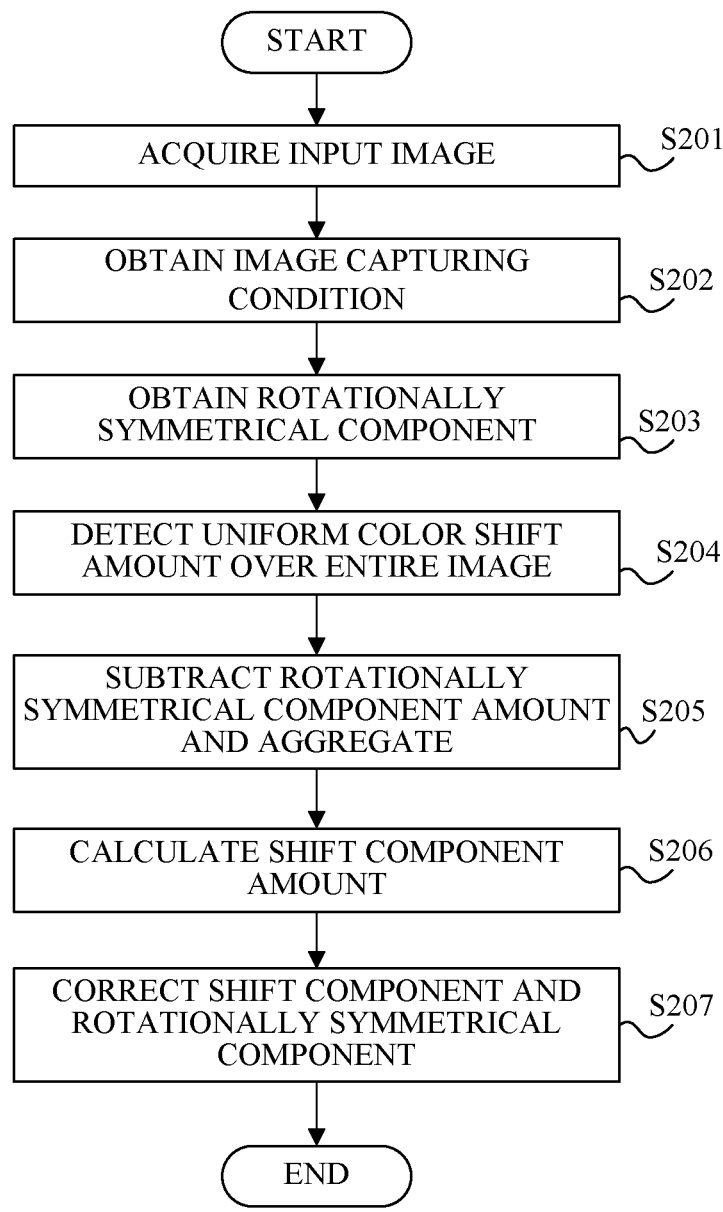
FIG. 7 is a flowchart of image processing according to a second embodiment of the present invention.

Next follows a description of a second embodiment according to the present invention. The image capturing apparatus according to this embodiment has the same basic configuration as that of the first embodiment, and common components will be designated by the same reference numerals. A flowchart in FIG. 7 illustrates a flow of image processing for correcting a lateral chromatic aberration according to this embodiment. The acquirer 104a in this embodiment obtains information of the rotationally symmetrical component amount as the first component information from the ROM 111, and the detector 104b detects a shift component amount (containing the direction) as the second component information.

The steps S201 and S202 are the same as the step S101 and S102 in the first embodiment (FIG. 6).

In the step S203, the image processor 104 (acquirer 104a) acquires the information of the rotationally symmetrical component amount corresponding to the image capturing condition obtained in the step S202 from the ROM 111. Similar to the first embodiment, the ROM 111 stores, as the data table, information of the rotationally symmetrical amounts under a plurality of representing image capturing conditions measured in the measuring process of the optical system 101 (or before the input image is obtained). The image processor 104 performs interpolation processing using information of the rotationally symmetrical amount under at least two representative image capturing conditions close to the current image capturing condition. The conversion with the pixel unit where the interchangeable lens apparatus includes the ROM 111 is similar to that in the step S103 in the first embodiment.

In the step S204, the edge detector 301 in the image processor 104 (detector 104b) detects a perpendicular edge (containing an approximately perpendicular edge) and a horizontal edge (containing an approximately horizontal edge) in the input image obtained in the step S201. The color shift amount acquirer 302 obtains (detects) the lateral chromatic aberration amount (lateral chromatic aberration information representing a total amount of the rotationally symmetrical component and the shift component) as the color shift amount in the horizontal direction in each edge portion that contains the perpendicular edge. In addition, the color shift amount acquirer 302 acquires (detects) the lateral chromatic aberration amount (lateral chromatic aberration information representing a total amount of the rotationally symmetrical component and the shift component) as the color shift amount in the perpendicular direction in each edge portion that contains the horizontal edge. In order to improve the detecting accuracy, the color shift amount may be acquired in an area as wide as possible in the input image.

In the step S205, the image processor 104 (calculator 104c) subtracts the rotationally symmetrical component amount obtained in the step S203 from the lateral chromatic aberration amount obtained in the step S204, and thereby obtains a color shift amount that is uniform over the entire input image. This color shift amount corresponds to the shift component amount. The calculator 104c obtains the aggregate result by aggregating the color shift amounts over the entire input image.

In the step S206, the calculator 104c calculates the shift component amount in the input image based on the aggregate result of the color shift amount obtained in the step S205. More specifically, the image processor 104 calculates a shift component amount as a two-dimensional vector based on the averaged results of the color shift amounts in the horizontal direction and the color shift amounts in the perpendicular direction. The calculator 104c performs the above error preventive process and the correction based on the data of the designed value component for the calculated result, and calculates the shift component amount as the second component information.

In the step S207, the image processor 104 (corrector 104d) performs the correction process for correcting the lateral chromatic aberration, for the input image, using the rotationally symmetrical component obtained in the step S203 and the shift component calculated in the step S206, thereby generating the corrected image in which the lateral chromatic aberration caused by the manufacturing error has been accurately corrected.

Third Embodiment

Next follows a description of a third embodiment according to the present invention. The first and second embodiments use the image capturing apparatus that includes the image processing apparatus, whereas in this embodiment, a personal computer ("PC") corresponding to the image processing apparatus executes image processing in accordance with an image processing program installed in it. In this embodiment, the PC obtains an input image as a captured image generated by the image capturing apparatus through a wired or wireless communication from the image capturing apparatus or a communication line, such as the Internet. The PC obtains information of the image capturing condition in capturing the input image from header information in the obtained captured image. The PC as the acquirer 104a obtains from the header information in the captured image, the first component information (such as a shift component amount or a rotationally symmetrical component amount) in the image capturing condition in capturing the image in the image capturing apparatus. Where the image capturing apparatus captures the image using the interchangeable lens apparatus, the image capturing apparatus obtains the first component information from the interchangeable lens apparatus that stores the information of the lateral chromatic aberrations on the designed value and caused by the manufacturing error. Then, the image capturing apparatus stores the first component information in the image file.

Other than the above points, this embodiment is similar to the first and second embodiments and a description thereof will be omitted.

Each of the above embodiments can accurately and robustly correct the lateral chromatic aberration caused by the manufacturing error of the optical system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-148594, filed Jul. 28, 2016, which is hereby incorporated by reference herein in its entirety.

What is claimed is:

1. An image processing apparatus configured to perform image processing on an input image generated by image capturing using an optical system, for correcting a lateral chromatic aberration that contains a rotationally symmetrical component and a shift component, the rotationally symmetrical component having an amount of lateral chromatic aberration that corresponds to an image height of the input image and a direction of lateral chromatic aberration that is orthogonal to a sagittal direction of the optical system, and the shift component having an amount of lateral chromatic aberration and a direction of lateral chromatic aberration that are uniform over the input image, the image processing apparatus comprising:
a memory storing instructions; and
a processor configured to implement the instructions stored in the memory and execute:
a first acquiring task that acquires first component information on a first component that is one of the rotationally symmetrical component, which is the component of the lateral chromatic aberration having the amount of lateral chromatic aberration that corresponds to the image height of the input image and the direction of lateral chromatic aberration that is orthogonal to the sagittal direction of the optical system, and the shift component, which is the component of the lateral chromatic aberration having the amount of lateral chromatic aberration and the direction of lateral chromatic aberration that are uniform over the input image, the first component information being acquired and stored before the input image is acquired;
a second acquiring task that acquires second component information on a second component that is the other of the rotationally symmetrical component, which is the component of the lateral chromatic aberration having the amount of lateral chromatic aberration that corresponds to the image height of the input image and the direction of lateral chromatic aberration that is orthogonal to the sagittal direction of the optical system, and the shift component, which is the component of the lateral chromatic aberration having the amount of lateral chromatic aberration and the direction of lateral chromatic aberration that are uniform over the input image, by using the input image and the first component information, the second component being different from the first component; and
a correcting task that generates a corrected image by performing a correction process for correcting the lateral chromatic aberration, for the input image, using the first component information and the second component information.

2. The image processing apparatus according to claim 1, wherein the second acquiring task acquires lateral chromatic aberration information by detecting the lateral chromatic aberration in the input image, and calculates the second component information using the first component information and the lateral chromatic aberration information.

3. The image processing apparatus according to claim 2, wherein the second acquiring task acquires the second component information by using a result obtained by subtracting an amount of the first component indicated by the first component information from a lateral chromatic aberration amount indicated by the lateral chromatic aberration information.

4. The image processing apparatus according to claim 3, wherein the second acquiring task acquires the second component information by using an aggregate result obtained by aggregating results of subtracting the amount of the first component from the lateral chromatic aberration amount at a plurality of positions on the input image.

5. The image processing apparatus according to claim 4, wherein the first component is the shift component and the second component is the rotationally symmetrical component, and
wherein the second acquiring task corrects the aggregate result by using information of a rotationally symmetrical component for preventing an error, obtained before the input image is obtained.

6. The image processing apparatus according to claim 5, wherein the rotationally symmetrical component for preventing the error is a rotationally symmetrical component related to a designed value of the optical system.

7. The image processing apparatus according to claim 1, wherein the first component is the rotationally symmetrical component, and the second component is the shift component.

8. The image processing apparatus according to claim 7, wherein the first component information is information on the rotationally symmetrical component related to a designed value of the optical system.

9. The image processing apparatus according to claim 7, wherein the first component information is information on the rotationally symmetrical component related to both a designed value of the optical system and a manufacture error of the optical system.

10. The image processing apparatus according to claim 1, wherein the first component is the shift component, and the second component is the rotationally symmetrical component.

11. The image processing apparatus according to claim 10, wherein the first component information is information on the shift component related to a manufacture error of the optical system.

12. The image processing apparatus according to claim 1, wherein the first component information is information acquired and stored when the optical system is manufactured or adjusted.

13. The image processing apparatus according to claim 1, wherein the optical system is included in a lens apparatus interchangeable to an image capturing apparatus, and
wherein the first acquiring task acquires the first component information from the lens apparatus.

14. The image processing apparatus according to claim 1, wherein the first acquiring task acquires the first component information from header information of the input image.

15. An image capturing apparatus comprising:
an image sensor configured to capture an object image formed by an optical system; and
an image processing apparatus according to claim 1.

16. A lens apparatus that comprises an optical system and is interchangeable to an image capturing apparatus according to claim 15,
wherein the lens apparatus stores the first component information and supplies the first component information to the image capturing apparatus.

17. An image processing method configured to perform image processing on an input image generated by image capturing using an optical system, for correcting a lateral chromatic aberration that contains a rotationally symmetrical component and a shift component, the rotationally symmetrical component having an amount of lateral chromatic aberration that corresponds to an image height of the input image and a direction of lateral chromatic aberration that is orthogonal to a sagittal direction of the optical system, and the shift component having an amount of lateral chromatic aberration and a direction of lateral chromatic aberration that are uniform over the input image, the image processing method comprising the steps of:
acquiring first component information on a first component that is one of the rotationally symmetrical component, which is the component of the lateral chromatic aberration having the amount of lateral chromatic aberration that corresponds to the image height of the input image and the direction of lateral chromatic aberration that is orthogonal to the sagittal direction of the optical system, and the shift component, which is the component of the lateral chromatic aberration having the amount of lateral chromatic aberration and the direction of lateral chromatic aberration that are uniform over the input image, the first component information being acquired and stored before the input image is acquired;
acquiring the second component information on a second component that is the other of the rotationally symmetrical component, which is the component of the lateral chromatic aberration having the amount of lateral chromatic aberration that corresponds to the image height of the input image and the direction of lateral chromatic aberration that is orthogonal to the sagittal direction of the optical system, and the shift component, which is the component of the lateral chromatic aberration having the amount of lateral chromatic aberration and the direction of lateral chromatic aberration that are uniform over the input image, by using the input image and the first component information, the second component being different from the first component; and
generating a corrected image by performing a correction process for correcting the lateral chromatic aberration, for the input image, with the first component information and the second component information.

18. A non-transitory computer-readable storage medium storing an image processing program that enables a computer to execute an image processing method configured to perform image processing on an input image generated by image capturing using an optical system, for correcting a lateral chromatic aberration that includes a rotationally symmetrical component and a shift component, the rotationally symmetrical component having an amount of lateral chromatic aberration that corresponds to an image height of the input image and a direction of lateral chromatic aberration that is orthogonal to a sagittal direction of the optical system, and the shift component having an amount of lateral chromatic aberration and a direction of lateral chromatic aberration that are uniform over the input image,
wherein the image processing method includes the steps of:
acquiring first component information on a first component that is one of the rotationally symmetrical component, which is the component of the lateral chromatic aberration having the amount of lateral chromatic aberration that corresponds to the image height of the input image and the direction of lateral chromatic aberration that is orthogonal to the sagittal direction of the optical system, and the shift component, which is the component of the lateral chromatic aberration having the amount of lateral chromatic aberration and the direction of lateral chromatic aberration that are uniform over the input image, the first component information being acquired and stored before the input image is acquired;
acquiring the second component information on a second component that is the other of the rotationally symmetrical component, which is the component of the lateral chromatic aberration having the amount of lateral chromatic aberration that corresponds to the image height of the input image and the direction of lateral chromatic aberration that is orthogonal to the sagittal direction of the optical system, and the shift component, which is the component of the lateral chromatic aberration having the amount of lateral chromatic aberration and the direction of lateral chromatic aberration that are uniform over the input image, by using the input image and the first component information, the second component being different from the first component; and generating a corrected image by performing a correction process for correcting the lateral chromatic aberration, for the input image, with the first component information and the second component information.

\* \* \* \* \*